UNITED STATES PATENT OFFICE.

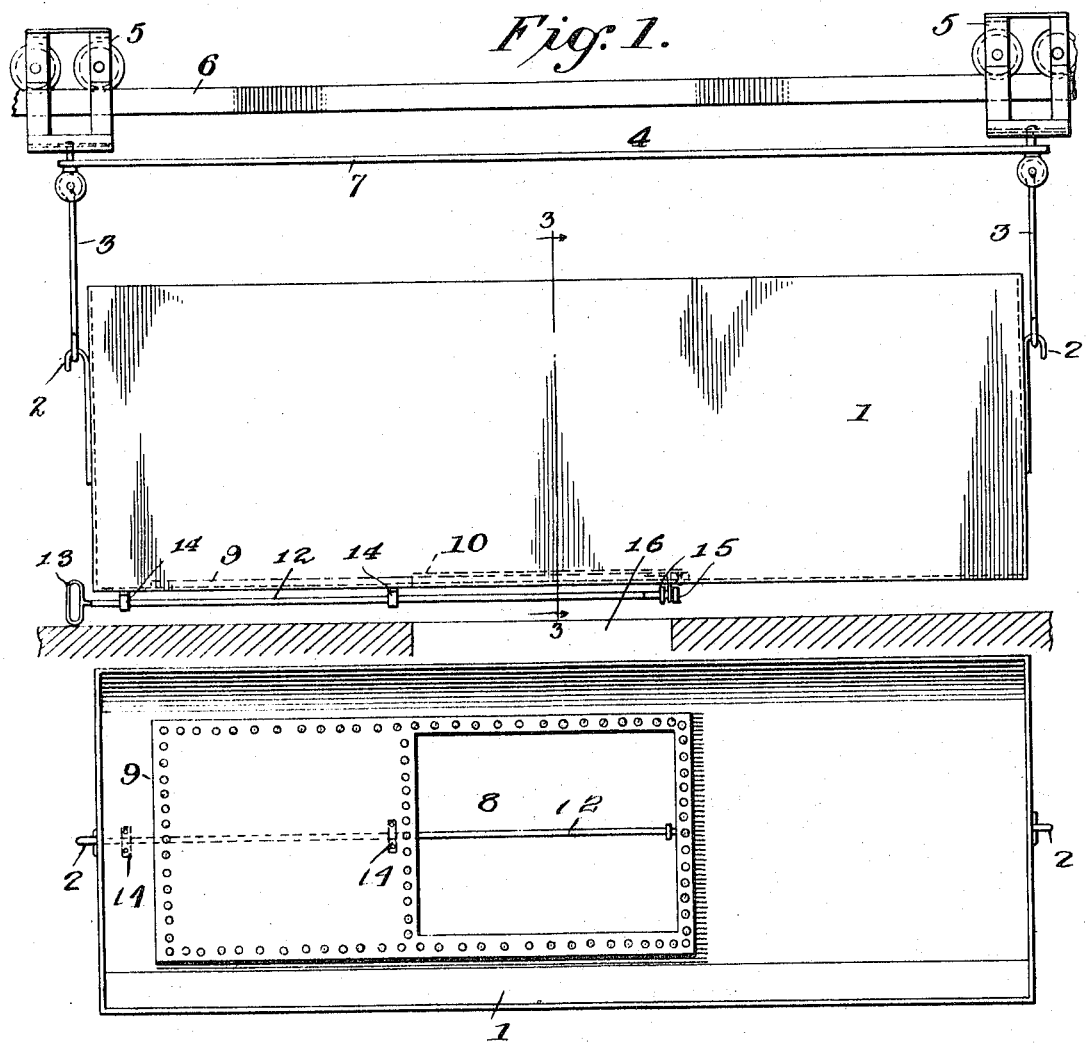
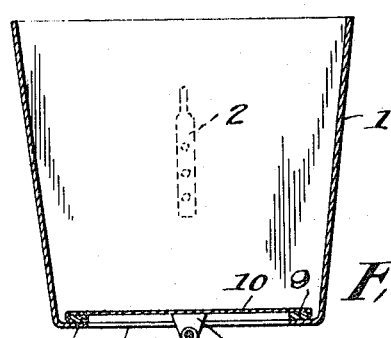
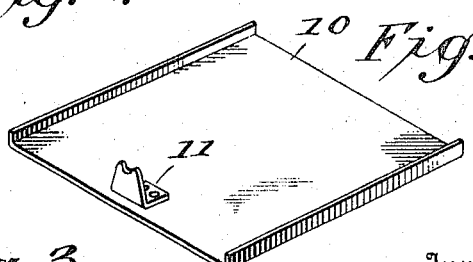

CORRY B. COMSTOCK, OF NEW YORK, N. Y., ASSIGNOR TO WARD BREAD COMPANY, A CORPORATION OF NEW YORK.

DOUGH-TROUGH.

1,203,705.   Specification of Letters Patent.   Patented Nov. 7, 1916.

Application filed May 31, 1911. Serial No. 630,380.

*To all whom it may concern:*

Be it known that I, CORRY B. COMSTOCK, a citizen of the United States, residing at New York, in the county of New York and State of New York, have invented certain new and useful Improvements in Dough-Troughs, of which the following is a specification, reference being had therein to the accompanying drawing.

This invention relates to improvements in dough troughs of the type adapted for receiving the dough from the mixing machines, for retaining it during the process of rising, and for conveying it to working and mixing machines.

In apparatus embodying my invention a trackway is provided preferably of the overhead type and on this trackway there are carried one or more dough troughs which are preferably at an elevation close to the floor. In the bottom of each trough is a relatively small discharge opening which is provided with a manually movable closure. The floor of the room in which the trackage is provided has an opening so positioned that the troughs can be moved over it to permit the discharge therethrough of the contents of the troughs by moving the bottom closures thereof.

The principal object of my invention, therefore, is to provide an apparatus having the characteristics above set forth.

A further object of the invention is to provide a dough trough of improved construction particularly as concerns the bottom opening and closure therefor.

In the accompanying drawings which show that form of my invention which I now deem preferable—Figure 1 is a side elevation. Fig. 2 is a plan view with the sliding door removed. Fig. 3 is a cross-sectional view taken along the line 3—3 of Fig. 1. Fig. 4 is a perspective view of the sliding door.

Referring to the drawings, 1 represents the trough body which is preferably rectangular in plan and provided with parallel end walls, downwardly converging side walls, and a bottom which is substantially horizontal from end to end. A suitable support is provided for the trough body, the support being adapted to permit horizontal movement. As shown, supporting hooks 2, 2 are secured to the end walls. These hooks are engaged by links 3, 3 which are suspended from a suitable elevated support which is arranged to permit horizontal movement. Preferably this support comprises a rail upon which is a trolley mechanism which is indicated as a whole by 4. This trolley mechanism comprises two separate trolleys 5, 5 each provided with two wheels adapted to travel upon the rail 6. The two trolleys are separated by means of the spacing bar 7.

In the bottom of the trough there is provided a relatively small opening 8 which is preferably rectangular. Secured to the bottom and provided with an opening in register with the opening 8 in the bottom there is preferably a relatively thick plate 9 which extends well toward one end of the trough.

10 is a sliding door adapted to cover the opening 8 and provided with depending lateral edges adapted to engage the sides of the plate 9. A depending notched lug 11 is provided on the door. This lug projects an appreciable distance below the bottom when the door is in place.

12 is a rod provided at one end with a handle 13 and mounted for longitudinal movement in brackets 14, 14 on the bottom of the trough. The other end of the rod is provided with two spaced collars 15, 15 which are adapted to engage the opposite sides of the depending lug 11 on the door. It will be observed that by the construction which I have described the door is free to slide longitudinally to cover or uncover the opening in the bottom of the trough. The door is guided in its longitudinal movement by the engagement of its depending lateral edges with the edges of the plate 9. The door is actuated through the rod 12 by means of the engagement of one or the other of collars 15 with the notched lug 11. It will be observed that the door is held in place merely by gravity and that it may be readily and quickly removed at any time for cleaning.

In dough troughs which have ordinarily been heretofore used it has been necessary to at least partially invert them in order to discharge their contents. In bakeries the molding machines are ordinarily on a floor below the troughs and the dough is discharged from the troughs through an opening in the floor. It will be obvious that when the trough is to be emptied by being turned about its longitudinal axis an opening in the floor at least as long as the trough is necessary. By my invention the large floor openings are made unnecessary and the dough may be discharged through a floor opening 16 approximately the size of that in the trough bottom. I have found that a relatively small opening in the trough, such as I have shown in the drawings, is ordinarily sufficient, and that all of the dough will, on account of its coherency and tenacity, pass out through the opening in a unitary mass.

In a dough trough it is essential, or, at least, preferable that the construction be such as to permit the dough mass to be of substantially uniform depth throughout. Any great variation in the depth of the dough would interfere seriously with the desired uniformity of the fermentation. It is therefore desirable to have the bottom of the trough as nearly horizontal as possible, no conical or inclined bottom to assist in the discharge of materials being possible. While I have shown a construction in which the bottom is entirely flat, it will be understood that my invention in its broader aspects is not limited to a bottom which is exactly flat throughout as minor variations might be made if desired.

The trough is elongated and relatively narrow, and I have provided a relatively small opening in the bottom through which the dough is discharged. I have found that on account of the peculiar consistency and tenacity of the dough that it will all flow out through the small opening when the closure is removed, all parts of the mass cohering and those parts at the ends being drawn toward the opening by the parts which first enter the opening. As already stated, the provision of a small bottom opening makes it possible to have a very much smaller opening in the floor than was heretofore necessary with the earlier troughs which had to be tilted to discharge their contents. The smaller opening not only requires less floor space but makes it possible for the more accurate delivery of the dough to the molding machines and other apparatus.

In large bakeries very large quantities of dough have to be mixed and all of the mixing is done at a certain hour. The mixed dough is placed in the troughs and allowed to rise. In order to handle the large quantities the troughs must be very long, sometimes being 12 feet in length, and a large number of these troughs must be provided as frequently provision must be made for the baking of as many as one hundred thousand loaves from a single batch. During the fermentation stage the dough in the troughs has to be available for inspection and for "cutting" to relieve excess gas. On this account the troughs have to be low down and close to the floor. When the time comes for molding the bread preparatory to baking, the loaves must be quickly discharged one after another to keep the molding machines busy and, in accordance with my invention, each of them can be easily and quickly moved over the floor opening and there quickly discharged with the minimum of effort on the part of the workmen, no bodily movement of the trough with respect to its carrier being required as was heretofore necessary in the case of the ordinary tilting trough. The proximity of the bottom of the trough to the floor insures the passage of the dough directly into the floor opening without any deflection and retardation. It will be obvious that with the troughs positioned low down, as shown and described, there is no room for any swinging door, a small sliding door being provided which is efficient and easily operated.

What I claim is:—

1. In an apparatus for holding dough while fermenting and delivering it thereafter, the combination of a bodily horizontally movable trough having an elongated relatively narrow body with a bottom which is substantially horizontal from end to end and adapted to be sustained closely adjacent to a horizontal floor, said bottom having an opening therein of considerably less area than that of the entire bottom, and a manually movable closure for the opening.

2. In an apparatus for holding dough while fermenting and delivering it thereafter, the combination of a bodily horizontally movable trough having an elongated relatively narrow body with a bottom which is substantially horizontal from end to end and adapted to be sustained closely adjacent to a horizontal floor, said bottom having an opening therein of considerably less area than that of the entire bottom through which dough in the trough can be discharged into a similarly sized opening in the said floor, and a manually movable closure for the opening.

3. In an apparatus for holding dough while fermenting and delivering it thereafter, the combination of a bodily horizontally movable trough having an elongated relatively narrow body with a bottom which is substantially horizontal from end to end and adapted to be sustained closely adjacent to a horizontal floor, said bottom having an opening therein of considerably less area than that of the entire bottom through which dough in the trough can be discharged into a similarly sized opening in the said floor, and a horizontally slidable manually movable closure for the opening.

4. In a dough carrying apparatus, the combination with a support permitting horizontal movement, of an elongated trough body carried by the said support and having a flat bottom provided with a relatively small opening, a parallel edged plate secured to the upper surface of the bottom and provided with an opening in register with that in the bottom, a slidable door having guiding means for engaging the parallel edges of the plate, and means for moving the door into or out of position to cover the openings in the plate and in the bottom.

5. In a dough carrying apparatus, the combination with a support permitting horizontal movement, of a trough body carried by the said support and having a bottom provided with a relatively small opening, and a slidable door above the bottom and held by gravity alone, the said door being movable into and out of position to cover the opening.

6. In a dough carrying apparatus, the combination with a support permitting horizontal movement, of a trough body carried by the said support and having a flat bottom provided with a relatively small opening, a slidable door above the bottom and held in place by gravity alone, a depending lug on the door extending through the opening, and a door moving element beneath the bottom and adapted to engage the said lug at opposite sides thereof only.

7. In a dough carrying apparatus, the combination with a support permitting horizontal movement, of a trough body carried by the said support and having a flat bottom provided with a relatively small opening, a door above the bottom and slidable into and out of position to cover the opening, depending guide elements on the door, and guiding means beneath the door for engaging the said elements.

In testimony whereof I affix my signature, in presence of two witnesses.

CORRY B. COMSTOCK.

Witnesses:
 ROBERT B. WARD,
 G. R. FENNENROY.